United States Patent [19]

Kotian

[11] 4,401,783
[45] Aug. 30, 1983

[54] FLAME RETARDANT ELASTOMERIC COMPOSITIONS AND ARTICLES USING SAME

[75] Inventor: Vijayraj M. Kotian, Stow, Ohio

[73] Assignee: Eaton Corporation, Cleveland, Ohio

[21] Appl. No.: 362,567

[22] Filed: Mar. 26, 1982

[51] Int. Cl.$^3$ .......................... C08K 3/10; C08K 5/06; C08K 5/09; C08K 5/02

[52] U.S. Cl. .................................. 524/371; 524/411; 524/412; 524/528; 525/211; 525/240

[58] Field of Search ............... 524/528, 411, 412, 371; 525/240, 211

[56] References Cited

U.S. PATENT DOCUMENTS

| | | | |
|---|---|---|---|
| 3,758,643 | 9/1973 | Fischer | 525/240 |
| 4,098,848 | 7/1978 | Morris | 524/411 |
| 4,130,535 | 12/1978 | Coran et al. | 525/211 |
| 4,259,230 | 3/1981 | Simons | 524/411 |

FOREIGN PATENT DOCUMENTS 2658814 2/1978 Fed. Rep. of Germany .

OTHER PUBLICATIONS

Santoprene Thermoplastic Rubber, Sales Brochure (undated) by Monsanto Company.
Santoprene RP101 Thermoplastic Elastomers, Technical Bulletin (undated) by Monsanto Company.

Primary Examiner—Carman J. Seccuro
Attorney, Agent, or Firm—C. H. Grace; A. E. Chrow

[57] ABSTRACT

Disclosed is a flame retardant thermoplastic elastomeric composition that in the form of an insulation about an electrical conductor is able to meet or exceed the requirements of UL VW-1 Vertical Flame Test and in the form of a jacket about an electrical cable is able to meet or exceed the requirements of IEEE-383 Cable Tray Flame Test while having a limiting oxygen index of only 24 to 27 percent. The composition has an elastomeric component of the type comprising about 25 to about 75 parts by weight of a crystalline olefin resin and about 75 to about 25 parts by weight of a vulcanized monoolefin copolymer rubber comprising a polymer of ethylene or propylene and one other alpha olefin of the formula $CH_2=CHR$ where R is an alkyl of 1–12 carbon atoms. The composition includes a non-elastomeric component comprising blending about 20 to about 40 parts by weight of a flame retardant compound and about 5 to about 20 parts by weight of antimony oxide and about 0.01 to about 8 parts by weight of lead stabilizer to 100 parts by weight of the elastomeric component. The flame retardant compound is a chlorinated or brominated or chlorobrominated compound or mixtures thereof having a halogen content of from about 50% to about 85% by weight of the compound and the lead stabilizer is selected from the group consisting of lead oxide, lead stearate, lead fumarate and lead phthalate stabilizers. The composition may include other additives including from about 1 to about 20 parts by weight of an olefinic polymer and up to about 250 parts by weight of extender oil to 100 parts by weight of the elastomeric component.

20 Claims, No Drawings

FLAME RETARDANT ELASTOMERIC COMPOSITIONS AND ARTICLES USING SAME

INTRODUCTION

This invention relates generally to a flame retardant thermoplastic elastomeric composition for use in making articles of manufacture and more particularly to a thermoplastic flame retardant elastomeric composition adapted for use as an electrical insulation and cable jacketing material having the ability, in the form of an electrically insulative covering about an electrical conductor, to meet or exceed the requirements of Underwriters Laboratories Flame Test UL VW-1 and, in the form of a jacket about an electrical cable, to meet or exceed the requirements of The Institute of Electrical and Electronic Engineers Inc., Cable Tray Flame Test IEEE-383 while having an oxygen index of only about 24 to about 27 percent.

BACKGROUND OF THE INVENTION

Flame retardant compositions for use in electrical wire and cable products have traditionally required an oxygen index under ASTM D 2863 of at least 28 percent in order to pass a flame test promulgated by the Institute of Electrical and Electronics Engineers known as the IEEE-383 Cable Tray Flame Test established to determine the resistance of an electrical cable to propogation of flame along its length while laying in a vertical tray. In addition, it has been the general practice in the past to provide compositions for use as an insulation on electrical conductors with an oxygen index of at least 28 percent in order for the insulated conductor to pass a vertical flame test promulgated by Underwriters Laboratories known as UL VW-1. As a result, an oxygen index of at least 28 percent has been a criterion that most manufacturers follow in making compositions to be used as an insulation about an electrical conductor and as a jacket about an electrical cable with particular emphasis on the latter when the cable is destined to be laid in open trays from one location to another even though in most cases it is necessary to add high levels of flame retardants and fillers to the compositions to achieve an oxygen index of 28 percent or higher which may in itself cause a deterioration in other physical and electrical characteristics of the compositions and promote undesirable processing characteristics.

There exists then a need to be able to provide a flame retardant composition that is adapted preferably for use as an insulation about an electrical conductor and/or as a jacket about an electrical cable that has an oxygen index of less than 28 percent and is imparted with attractive physical and electrical properties while still being able to pass the UL VW-1 vertical flame test when in the form of an insulative covering about an electrical conductor and to pass the IEEE-383 Cable Tray Flame Test when in the form of a jacket about an electrical cable.

SUMMARY OF THE INVENTION

Accordingly, it is an object of this invention to provide a flame retardant thermoplastic elastomeric composition having an oxygen index of from about 24 to about 27 percent that is imparted with attractive physical, electrical and processing characteristics and is particularly adapted for use as an insulative covering about an electrical conductor and as a jacket about an electrical cable.

It is another object of this invention to provide a flame retardant thermoplastic elastomeric composition that although having an oxygen index of from about 24 to about 26 percent under ASTM 2863 is able to pass the IEEE-383 Cable Tray Flame Test when in the form of a jacket about an electrical cable and the UL VW-1 Flame Test when in the form of an insulative covering about an electrical conductor.

DETAILED DESCRIPTION OF PREFERRED EMBODIMENTS

It has been found that a flame retardant thermoplastic elastomeric composition can be made in accordance with the present invention by providing a composition compounded from a non-elastomeric component and a particular type of thermoplastic elastomeric component.

The thermoplastic elastomeric component is of the type disclosed in U.S. Pat. No. 4,130,535 (assigned to Monsanto Company) the disclosure of which is incorporated herein by reference. Disclosed in the patent is a class of thermoplastic elastomers that are based upon a composition comprising about 25 parts to about 75 parts by weight of a thermoplastic polyolefin resin and about 75 parts to about 25 parts by weight of a polymer of monomers comprising ethylene or propylene and at least one other alpha olefin of the formula $CH_2=CH_2R$ in which R is an alkyl of 1 to 12 carbon atoms. The composition may contain from none to a minor portion of at least one copolymerizable diene and may further contain extender oil up to about 250 parts by weight per 100 parts by weight of the composition.

Although other methods are disclosed in the Monsanto patent for determining the amount of cross-linking in the vulcanized rubber portion of the subject compositions, one such method disclosed is where the vulcanized rubber of the Monsanto blends are cross-linked sufficiently to provide a tensile strength that is at least about 60 kg/cm$^2$ greater than that of the unvulcanized blend in addition to the rubber portion being sufficiently small particles dispersed throughout the blend. Preferably the polyolefin resin is polyethylene or polypropylene and the rubber is EDPM rubber which is the product from the polymerization of ethylene, propylene and a lesser quantity of non-conjugated diene.

Thermoplastic elastomers falling within the scope of the Monsanto patent are commercially sold by Monsanto under the trademark "Santoprene". Elastomers made in accordance with the subject patent that in molded form have a durometer of about 70 Shore A to about 50 Shore D are of particular interest in practicing the present invention.

As previously described, there is a need to provide a composition which in the form of an insulation layer about an electrical conductor is able to pass the UL VW-1 Flame Test and in the form of a jacket about an electrical cable is able to pass the IEEE-383 Cable Tray Flame Test. The former test is used as a criterion for measuring the propogation of flame along a length of the insulated conductor supported vertically with the lower end exposed by a Tirrill burner to five-15 second exposures of flame whereas the latter test is used as a criterion for measuring the proprogation of the flame along a 14" nominal length of cable supported vertically on a tray with the lower end exposed to an air-propane mixture generating a flame source having a heat content of about 70,000 Btu/hr.

It was thought prior to the present invention that a composition must have an oxygen index under ASTM D-2863 of 28 percent or higher in order to pass the flame tests. As a result, those ordinarily skilled in the art have been forced to add higher amounts of flame retardant additives in order to impart an oxygen index to their respective materials that is 28 percent or higher. Unfortunately in adding such higher amounts of flame retardants, other physical and electrical properties are apt to suffer as is well known to those ordinarily skilled in the art.

At first it was thought that perhaps adding nominal amounts of flame retardants and other additives to conventional thermoplastics such as sold by Shell Chemical Company under the trademark "Elexar", such as "Elexar" 4609, or thermoplastic elastomers sold by Uniroyal under the trademark "TPR", such as "TPR" 1909E, might be useful in providing a composition having suitable physical and electrical properties in addition to meeting or exceeding the requirements of the above described flame tests. However, as indicated in Table I below, such compositions exhibited either poor tensile strength, or percent elongation at break or both in addition to possessing an oxygen index for the amount of flame retardant and other additives added that is too low to insure that they would satisfactorily pass the flame tests.

TABLE I

| | (Parts by Weight) | |
|---|---|---|
| Sample | A | B |
| Elexar 4609 | 100 | |
| | (Durometer 65–70 A) | |
| TPR 1909E | | 100 (Durometer 90 A) |
| Dechlorane Plus | 25 | 25 |
| Burgess KE | 40 | 20 |
| Lead Stabilizer | 3 | 3 |
| Antimony Oxide | 12 | 12 |

In Table I above, Dechlorane Plus is a chlorinated flame retardant sold under the trademark "Dechlorane" by Hooker Chemical Company. Burgess KE is a calcined clay sold by Burgess Company. Antimony oxide is standardly available from numerous chemical supply houses. The lead stabilizer is a lead fumarate sold by Associated Lead Inc.

The above samples were each blended in a Banbury at about 350° F. and subsequently milled at about 375° F. and compression molded at about 400° F. to about 420° F. The properties obtained are indicated in following Table II.

TABLE II

| Sample | A | B | Test Method |
|---|---|---|---|
| Hardness, Shore A, 10 sec | 76 | 98 | ASTM D 2240 |
| Tensile Strength, psi | 1518 | 930 | ASTM D 638 |
| Ultimate Elongation, % | 640 | 93 | ASTM D 638 |
| 100% Modulus, psi | 551 | — | ASTM D 638 |
| Limiting Oxygen Index, % | 22.2 | 24.2 | ASTM D 2863 |
| Vertical Flame Test[1] | drips | drips | UL 94 |

[1]The UL 94 Test is a vertical flame test conducted on samples of the compositions taken from molded slabs. The properties obtained are indicative of the results to be expected when later processed into finished form.

The above clearly indicates in comparison to compositions of the invention hereinafter described that thermoplastic elastomers such as Elexar 1409 and TPR 1909E drip when exposed to a flame and are not able to be compounded with flame retardants and other additives to the extent that they are imparted with a low level oxygen index and yet are able to pass vertical flame testing in conjunction with possessing good physical properties. Such thermoplastics in contrast to the Monsanto thermoplastic elastomers are blends or copolymers of olefin resins and rubber that has only been partially vulcanized such as, for example, disclosed in U.S. Pat. Nos. 3,037,954, 4,031,169, 4,036,912, and 4,046,840.

It has been surprisingly discovered however that contrary to the teaching provided as a result of the above investigation, that a low oxygen index level can be achieved where the elastomer has been substantially vulcanized such as in the case of the Monsanto thermoplastic elastomers previously described rather than devoid of vulcanization or only partially vulcanized as in the case of the thermoplastic elastomers disclosed in the above referenced patents.

Although one ordinarily skilled in the art would not think that a difference in degree of vulcanization would impart a vastly improved resistance to burning when exposed to a flame is conjunction with low oxygen index levels, such has been found to be the case and the discovery has led to the ability to provide thermoplastic flame retardant compositions having an elastomeric component as previously described and a non-elastomeric component as hereinafter described that are imparted with an oxygen index of only about 24 to about 27 that are able to pass UL VW-1 and IEEE-383 Vertical Flame Testing while retaining attractive physical and wet and dry electrical properties.

It has been found that compositions of the present invention can be made where blends of the Monsanto thermoplastic elastomers of the type disclosed in their U.S. Pat. No. 4,130,535 having a hardness of about 70 Shore A to about 50 Shore D are used as the elastomeric component in conjunction with a non-elastomeric component generally comprising: (a) from about 20 parts to about 40 parts by weight of a flame retardant compound selected from the group consisting of chlorinated or brominated or chlorobrominated compounds and mixtures thereof per 100 parts by weight of the elastomeric component and having a halogen content of about 50% to about 85% by weight of the total weight of the compound; (b) from about 5 parts to about 20 parts by weight of antimony oxide per 100 parts by weight of the elastomeric component; and (c) from about 0.01 parts to about 8 parts by weight of a lead stabilizer selected from the group consisting of lead oxide, lead stearate, lead fumarate, and lead phthalate stabilizers and mixtures thereof per 100 parts by weight of the elastomeric component.

The compositions of the invention described above and by way of the following illustrative examples are able to be extended or molded for use with articles of manufacture and are particularly suitable for use as flame retardant insulative covering about electrical conductors that is able to meet or exceed the requirements of UL VW-1 Flame Test and as a jacket about electrical cable is able to meet or exceed the requirements of IEEE-383 Cable Tray Flame Test while having an oxygen index of only from about 24 to about 27.

It is to be understood, that compositions of the present invention may include other additives such as U.V. stabilizers, colorants, antioxidants, metal/deactivators, processing aids and the like as long as such additives do not adversely interfere with the desired physical and electrical properties nor inhibit the ability of the compositions to meet or exceed the requirements of the UL VW-l and IEEE-383 Flame Tests.

Following Table II illustrates some examples of compositions made in accordance with the invention.

TABLE III

| Sample | Parts by Weight | | | | | | |
|---|---|---|---|---|---|---|---|
| | C | D | E | F | G | H | I |
| Santoprene 101-87 | 100 | 100 | 100 | 100 | 90 | 80 | 90 |
| GRSN 7441 | — | 10 | — | — | — | — | — |
| Profax 6723 | — | — | 10 | 20 | 10 | 20 | 10 |
| Dechlorane Plus | 25 | — | — | — | — | — | — |
| Decabromobiphenyl Oxide | — | 25 | 28 | 32 | 25 | 25 | 36 |
| Burgess KE Clay | 20 | 20 | 24 | 24 | — | — | — |
| Tetra-basic lead Fumarate | 3 | 1 | 2 | 2 | 2 | 2 | 2 |
| Antimony Oxide | 12 | 10.5 | 12 | 16 | 12 | 12 | 16 |
| Irganox 1010 | — | .5 | — | — | — | — | — |

The compositions in above Table III were blended in a Banbury at about 350° F. and milled at about 375° F. and compression molded at about 420° F. for three minutes at about 4,000 psi. The properties exhibited by samples taken from the molded slabs are indicated in following Table IV.

TABLE IV

| Property | ASTM Method | SAMPLE | | | | | | |
|---|---|---|---|---|---|---|---|---|
| | | C | D | E | F | G | H | I |
| Density (gm/cm³) | D 792 | 1.310 | 1.255 | 1.308 | 1.310 | 1.216 | 1.204 | 1.276 |
| Hardness Shore A (10 sec) | D 2240 | 95 | 97 | 97 | 98 | 96 | 97 | 97 |
| Hardness Shore D (10 sec) | D 2240 | — | 40 | 45 | 47 | — | — | — |
| Tensile Strength (psi) | D 638 | 1485 | 1465 | 1620 | 1700 | 1660 | 1580 | 1625 |
| 100% Modulus (psi) | D 638 | 1135 | 1065 | 1190 | 1285 | 1145 | 1320 | 1050 |
| Ultimate Elongation (%) | D 638 | 275 | 320 | 325 | 320 | 325 | 255 | 370 |
| Cold Temp. Brittleness (°C.) | D 746 | — | — | −25 | −25 | — | — | −34 |
| Limiting Oxygen Index (%) | D 2863 | 24.6 | 26.9 | 26.9 | 26.9 | 24.6 | 25.6 | 23.7 |

In above Table IV, Santoprene 101-87 is a black thermoplastic elastomer having a durometer of 87 Shore A sold by Monsanto Company. GRSN-7441 is a linear low density polyethylene sold by Union Carbide Corporation, Profax 6723 is a polypropylene sold under the trademark "Profax" by Hercules Incorporated. Decabromobiphenyl oxide is a brominated flame retardant sold by Saytech Incorporated. Burgess KE is a calcined clay sold by Burgess Pigment Company. Tetra-basic lead fumarate is a lead stabilizer sold by Associated Lead Inc. Antimony oxide is available from numerous chemical supply sources. Irganox 1010 is a tetrafunctional phenolic antioxidant sold under the "Irganox" trademark by Ciba Geigy.

Compositions C-I of above Table IV were able to meet or exceed the flame test requirements of UL 94 without dripping as well as the flame test requirements of UL VW-1 and IEEE-383 wherein, as previously described, thermoplastic elastomers having only a partially vulcanized rubber component, such as Samples A and B of Table I dripped when exposed to flame during the UL 94 test. The above compositions also illustrate the attractive tensile strength, 100 percent modulus and elongation at break as well as relative high hardness in contrast to Samples A and B previously described. It will also be noted that compositions C-I of Table IV exhibit an oxygen index of from 23.8 to 26.9 and generally exhibit attractive physical properties and resistance to burning without drip regardless of the presence of clay in the composition.

It is also surprising that polyolefin such as polypropylene and linear low density polyethylene are able to be added to the compositions of the invention since they generally burn yet unexpectedly do not aggravate any burning tendency in the compositions without adversely affecting dry and wet electrical properties in addition to improving the processability of the compositions. Although the addition of polyolefins to the compositions of the invention are not required, it has been determined that they can be added in amounts of from about 1 part to about 20 parts by weight per 100 parts by weight of the elastomeric component.

Samples J through O shown in following Table V illustrate that other additives or combinations of additives may be added to the compositions of the invention where desired to improve heat aging resistance and dry and wet electrical characteristics and other properties where desired.

TABLE V

| Sample | Parts by Weight | | | | | |
|---|---|---|---|---|---|---|
| | J | K | L | M | N | O |
| Santoprene 201-87 | — | — | — | — | — | 85 |
| Santoprene 101-87 | 90 | 85 | 90 | 80 | 80 | — |
| Profax 6801 | 10 | 15 | 10 | — | — | 15 |
| GRSN 7441 | — | — | — | 20 | — | — |
| XO-61500.37 | — | — | — | — | 20 | — |
| Decabromobiphenyl Oxide | 32 | 32 | — | 32 | 32 | 32 |
| Dechlorane Plus | — | — | 35 | — | — | — |
| Tetra-Basic Lead Fumarate | 2 | 2 | 2 | 2 | 2 | 2 |
| Antimony Oxide | 10 | 10 | 8 | 10 | 10 | 10 |
| Cyanox LTDP | .2 | .2 | .2 | .2 | .2 | .2 |
| Irganox 1010 | .4 | .4 | .4 | .4 | .4 | .4 |
| Irganox MD 1024 | .2 | .2 | .2 | .2 | .2 | .2 |

In above Table V, Santoprene 201-87 is a natural thermoplastic elastomer sold by Monsanto Company. Profax 6801 is a polypropylene sold Hercules Incorporated under the trademark "Profax". XO-61500.37 is a medium density polyethylene sold by Dow Chemical Company. Dechlorane Plus is a chlorinated flame retardant sold by Hooker Chemical Company. Cyanox LTDP is a dilaurylthiodiproprionate antioxidant sold by American Cyanamid Corporation. Irganox MD 1024 is an antioxidant metal/deactivator sold by Ciba Geigy.

Samples J-O of above Table V were blended in a Banbury at about 350° F. and then milled at about 375° F. and compression molded into slabs at about 420° F. under about 4,000 psi. The properties exhibited by samples taken from the molded slabs are indicated in following Table VI.

TABLE VI

| Property | ASTM Method | SAMPLE | | | | | |
|---|---|---|---|---|---|---|---|
| | | J | K | L | M | N | O |
| Density, gm/cm$^3$ | D 792 | 1.23 | 1.23 | 1.16 | 1.23 | 1.23 | 1.21 |
| Hardness Shore A, 10 sec. | D 2240 | 94 | 99 | 98 | 94 | 97 | 95 |
| Hardness Shore D, 10 sec. | D 2240 | 44 | 48 | 47 | 44 | 45 | 44 |
| Tensile Strength, psi | D 638 | 1900 | 1875 | 1620 | 1370 | 1570 | 2170 |
| 100% Modulus, psi | D 638 | 1145 | 1280 | 1080 | 990 | 1120 | 1185 |
| Ultimate Elongation, % | D 638 | 380 | 360 | 360 | 350 | 350 | 446 |
| Limiting Oxygen Index % | D 2863 | 26 | 26.5 | 23.7 | 26.5 | 26.5 | 25.6 |

All of above Samples J-O were able to pass UL 94 vertical flame test without dripping as well as meet or exceed the requirements of the UL VW-1 and IEEE-383 flame tests with a limiting oxygen index of from about 24 to about 27.

Samples J-O illustrate that medium density polyethylene as well as low density polyethylenes (Sample C in Table IV) or polypropylenes may be used to make compositions in accordance with the invention. Samples J-O also illustrate that the addition of metal/deactivators may be undertaken in compositions of the invention that are to be used as primary insulation about copper conductors as a means of preventing the copper from poisoning the composition as is well known to those ordinarily skilled in the art. Also illustrated in Samples J-O is the fact that combinations of additives may be used where desirable such as the mixture of Cyanox LTDP and Irganox 1010.

As in the case of Samples C-I, Samples J-O again illustrate the remarkably attractive properties such as hardness, tensile strength, 100% modulus and elongation associated with the compositions of the invention which unexpectedly are able to meet or exceed the requirements of the UL VW-1 and IEEE-383 flame tests while having an oxygen index of only about 24 to about 27.

It has been determined that compositions of the invention are able to be made by the incorporation of either chlorinated or brominated flame retardants or chlorobrominated flame retardants or mixtures thereof having a halogen content by weight to the total weight of the flame retardant of about 50% to about 85%. It has been further found that the compositions of the invention can be readily processed into articles of manufacture by conventional molding or extrusion techniques particularly where polyolefins are added to the formulation in the amounts hereinbefore described and that when in the form of primary insulation about an electrical conductor or as a jacket about electrical cable are able to achieve a dry electrical rating of 125° C. and an Insulated Conductors Electrical Association EM 60 wet electrical rating of 75° C./90° C.

The elastomeric component of the invention may contain up to about 250 parts by weight to the weight of the elastomeric component of extender oil provided such is counteracted by appropriate addition of the brominated and chlorobrominated compounds and antimony oxide to offset any dripping that may arise when the compositions are exposed to flame.

It has also been determined that compositions of the invention may include from about 1 part to about 20 parts per weight of a filler such as clay, aluminum trihydrate, or other suitable fillers or mixtures of fillers per 100 parts by weight of the elastomeric component and may also include coupling agents such as vinyl silane where desired. It may also include one or more antioxidants generally in the range of about 0.1 to about 7 parts by weight per 100 parts by weight of the elastomeric component where it is desired to enhance the heat aging and electrical characteristics of the composition. Examples of antioxidants found suitable for use in the compositions of the invention include trifunctional and tetrafunctional hindered phenolic, dilauryl thiodiproprionate, tetra-basic lead fumarate, zinc borate, zinc salt of a blend of 4- and 5-methylmercapto benzimidazole sold under the trademark "Vulkanox ZMB-2" by Mobay Chemical Company, a trifunctional hindered phenolic compound sold under the trademark "Agerite GT" by R. T. Vanderbilt and pentaerythritol tetrakis (B-laurythiopropionate) antioxidant sold under the trademark "Seenox 412S" by Witco Chemical Company.

Although suitable polyolefins such as polypropylene and polyethylene and mixtures thereof may be added to the compositions at about 1 part to about 20 parts by weight per 100 parts by weight of the elastomeric component, it is preferred that they be added at about 5 parts to about 12 parts and that the chlorinated brominated and/or chlorobrominated flame retardants and mixtures thereof preferably comprise from about 20 parts to about 40 parts per 100 parts by weight of the elastomeric component and that the lead stabilizer or mixtures of lead stabilizers be added at about 1 part to about 5 parts by weight to 100 parts by weight of the elastomeric component.

What is claimed is:

1. A flame retardant thermoplastic elastomeric composition containing an elastomeric component and a non-elastomeric component; said elastomeric component in molded form having a durometer of from about 70 Shore A to about 50 Shore D and made from a blend of the type comprising about 25 to about 75 parts by weight of crystalline thermoplastic olefin resin and about 75 to about 25 parts by weight of fully vulcanized monoolefin copolymer rubber, said rubber being a polymer of monomers comprising ethylene or propylene and at least one other alpha olefin of the formula $CH_2=CHR$ in which R is an alkyl of 1 to 12 carbon atoms, and from none to a minor portion of at least one copolymerizable diene, and being sufficiently small dispersed particles vulcanized to the extent that the blend has a tensile strength of at least about 60 kg/cm$^2$ greater than that of the unvulcanized blend, said non-elastomeric component comprising;

(a) from about 20 parts to about 40 parts by weight of a flame retardant compound selected from the group consisting of chlorinated brominated and chlorobrominated compounds and mixtures thereof per 100 parts by weight of said elastomeric component, said compounds having a halogen content of about 50% to about 85% by weight to the total weight of said compound;

(b) from about 5 parts to about 20 parts by weight of antimony oxide per 100 parts by weight of said elastomeric component, and (c) from about 0.01 parts to about 8 parts by weight of a lead stabilizer selected from the group consisting of lead oxide, lead stearate, lead fumarate, and lead phthalate stabilizers and mixtures thereof per 100 parts by weight of said elastomeric component, and said composition having ASTM D 2863 limiting oxygen index of from about 24 to about 27 percent and in the form of an insulative covering about an electrical conductor able to meet or exceed the flame test requirements of UL VW-1 and in the form of a jacket about an electrical cable able to meet or exceed the cable flame test requirements of IEEE-383.

2. The composition of claim 1 wherein the elastomeric component contains up to about 250 parts by weight of extender oil per 100 parts by weight of said component.

3. The composition of claim 1 including from about 1 to about 20 parts by weight of at least one olefinic polymer per 100 parts by weight of said elastomeric component.

4. The composition of claim 3 wherein the olefinic polymer is polypropylene.

5. The composition of claim 3 wherein the olefinic polymer is polyethylene.

6. The composition of claim 1 including from about 1 part to about 20 parts by weight of at least one filler per 100 parts by weight of said elastomeric component.

7. The composition of claim 6 wherein the filler is clay.

8. The composition of claim 7 wherein the clay is calcined clay.

9. The composition of claim 1 including from about 0.1 part to about 7 parts by weight of at least one antioxidant per 100 parts by weight of said elastomeric component.

10. The composition of claim 9 wherein the antioxidant is a trifunctional hindered phenolic antioxidant.

11. The composition of claim 9 wherein the antioxidant is a tetrafunctional hindered phenolic antioxidant.

12. The composition of claim 9 wherein the antioxidant is a dilauryl thiodiproprionate antioxidant.

13. The composition of claim 1 wherein the brominated flame retardant compound is a decabromo biphenyloxide compound.

14. The composition of claim 1 wherein the parts by weight of the brominated flame retardant compound is from about 20 parts to about 40 parts.

15. The composition of claim 1 wherein the parts by weight of the lead stabilizer is from about 1 part to about 5 parts.

16. The composition of claim 3 wherein the parts by weight of the olefinic polymer is from about 5 parts to about 12 parts.

17. The composition of claim 1 wherein the lead phthalate stabilizer is a dibasic lead phthalate stabilizer.

18. The composition of claim 1 wherein the lead fumarate stabilizer is a tetrabasic lead fumarate stabilizer.

19. The composition of claim 1 or 2 including from about 0.1 to about 0.5 parts by weight of a metal/deactivator per 100 parts by weight of said elastomeric component.

20. An article of manufacture using the composition of claim 1.

* * * * *